March 26, 1946.  L. W. CHUBB, JR., ET AL  2,397,242
COATING COMPOSITIONS
Filed Feb. 26, 1941
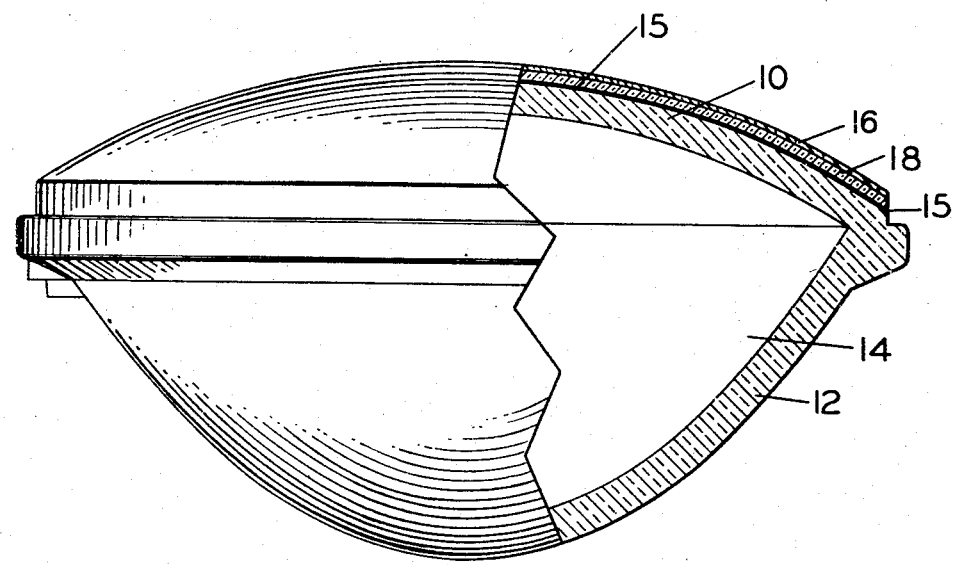
Lewis W. Chubb, Jr.
and
Clinton J. F. Young
INVENTOR.
BY Donald L. Brown
Attorney Patented Mar. 26, 1946

2,397,242

UNITED STATES PATENT OFFICE 2,397,242

COATING COMPOSITION

Lewis W. Chubb, Jr., Sharon, and Clinton J. T. Young, Cambridge, Mass., assignors to Polaroid Corporation, Dover, Del., a corporation of Delaware Application February 26, 1941, Serial No. 380,660

10 Claims. (Cl. 88—65)

This invention relates to coating compositions and more particularly to plastic coatings for use in combination with light-polarizing devices such as polarizing headlights for automobiles and the like.

It has already been proposed to employ in automobile lighting a system comprising polarizing headlights and a viewing screen or windshield of polarizing material adapted to block the polarized light emanating from the headlights of an approaching car. One of the problems involved in perfecting such a system is that of how to incorporate the desired polarizing material in headlight lenses. It may, for example, be done by laminating a sheet of polarizing material between glass plates to form a lens. However, the majority of automobiles now being manufactured utilize headlights having spherically curved lenses, and the cost of laminating polarizing material into such a lens is a substantial objection to this procedure.

It has now been proposed, therefore, to apply polarizing material to the outer surface of the lens. It accordingly becomes necessary to provide means for protecting such a polarizer from the various forces to which a headlight is subjected, and it is to the solution of this problem that this invention is directed.

One of the objects of the invention is to provide a light-transmitting coating which will protect polarizing material from moisture, abrasion, impact, and other such forces to which a headlight lens is commonly subjected.

Another object is to provide such a coating for a headlight lens, which will be substantially unaffected by the light and heat generated in said headlight.

A further object is to provide such a coating in dual layer form, the inner layer being relatively thick and resilient and serving as a cushion to protect the lens and polarizing material from impact, and the outer layer being relatively thin and hard and serving to protect said inner layers from abrasion.

Still further objects are to determine the preferred materials and methods for forming the novel coatings of the invention.

Other objects and advantages will in part appear and in part be pointed out in the course of the following description of several embodiments of the invention, which are given as non-limiting examples, in connection with the accompanying drawing, which is a side elevation, partly cut away, of a "sealed beam" headlight having a light-polarizing lens protected by a coating embodying a form of the invention.

Lens 10 of the headlight shown in the drawing is sealed to reflector portion 12, provided on its inner surface with a reflecting metal coating 14. A conventional filament may be mounted in the usual way within reflector 12.

On the outer surface of lens 10 there is provided a layer of light-polarizing material, as indicated by heavy line 15, bonded in any suitable way to the lens surface. Polarizing layer 15 may comprise any of a variety of sheet polarizing materials such as those sold under the trade name "Polaroid." For example, layer 15 may comprise a relatively thin film of a molecularly oriented plastic such as polyvinyl alcohol applied directly to the lens surface, as by being rubbed thereon, and having incorporated therein a dichroic stain. Adequate polarization of the light transmitted by lens 10 may be effected by using such a layer of extreme thinness, for example, in the order of .00015 inch.

It will be seen that when the headlight shown in the drawing is mounted in an automobile, polarizing layer 15 on its surface will be subjected to a variety of forces, particularly moisture, heat, light, abrasion and impact. It is desirable to provide means for protecting both said polarizer and the remainder of the headlight lens from all of these destructive forces. Whenever a protective coating is used, it will preferably be as light and thin and accordingly as inexpensive as possible. In general, satisfactory results will not be obtained with a single coating, for the reason that if such a coating is thin enough to resist impact, it may be subject to destruction by abrasion. Conversely, if the coating is sufficiently thick to resist abrasion, it may suffer as a result of impact, as for example by being caused to separate from the polarizing layer or lens. This difficulty may be overcome by making the coating of substantial thickness, but in this event it becomes subject to the further disadvantages of excessive weight and cost.

It appears that these difficulties are preferably overcome by providing for the polarizer a dual layer coating. The inner layer adjacent the polarizing material should be resilient and sufficiently thick to absorb impact on the lens and prevent its effect from reaching the polarizing layer. The outer or surface layer, on the other hand, should be as hard as possible in order to resist abrasion, but at the same time it should be sufficiently thin to transmit impact to the cushion layer without cracking. Such a dual layer coating is shown in the drawing, wherein the hard surface layer is indicated at 16 and the inner, cushion layer is indicated at 18.

Coatings having the above impact-resistant and abrasion-resistant properties may be formed from a wide variety of materials. In addition to the two properties mentioned, said coating should be substantially moisture-proof and should not be affected in its other properties by the action of either light or heat, at least by the intensities of light and heat to which an automobile headlight lens is subjected.

Among the materials found satisfactory for producing the coatings of the invention are a variety of thermo-setting resins, preferred examples being resins of the urea-formaldehyde type such, for example, as urea-formaldehyde and melamine-formaldehyde. These materials in substantially pure form are relatively extremely brittle, but their physical properties may be modified by the addition thereto of various so-called "modifiers," such, for example, as those of the alkyd type. The specific materials used and the proportions thereof may be varied to a considerable extent. A number of examples will therefore be given, but it is to be understood that these examples are to be interpreted as illustrative only, and not as in any way limiting the scope of the invention.

In the preferred practice of the invention, cushion layer 18 should be formed from material which will adhere firmly both to polarizing layer 15 and surface layer 16 but which will retain a substantial degree of resiliency under such conditions of light and heat as lens 10 may encounter in use. A satisfactory thickness for a layer having such properties is approximately .010–.020 inch, and suitable materials for use therein are urea-formaldehyde type resins to which have been added a non-oxidizing and substantially non-setting alkyd modifier, that is to say, a modifier which will not set to complete rigidity but will always retain at least a certain degree of elasticity. Moreover, it appears desirable that said layer also include an oxidizing modifier. For example, said layer may comprise a mixture of approximately three parts of the urea-formaldehyde compound sold under the trade name "Polymerin 400-1," a product of Ault & Wiborg Corporation, and one part of the alkyd modifier sold as "Paraplex G-20," a product of Resinous Products & Chemical Co., Inc. Alternatively, substantially the same properties may be obtained by using in layer 18 a mixture made of:

| | Per cent |
|---|---|
| "Uformite F-200" | 37½ |
| "Duraplex A-27" | 37½ |
| "Paraplex G-20" | 25 | all of said materials being products of Resinous Products & Chemical Co., Inc.

It will be noted that the examples given of suitable mixtures for use in layer 18 both comprise resins of the thermo-setting type. Alternatively, however, there may be used a material such as a chemically plasticized vinyl acetal resin, for example, a mixture composed of approximately 55% of the product sold as "Vinylite X," a product of Carbide & Carbon Chemicals Corp., and approximately 45% of tricresyl phosphate. Such a coating may be less satisfactory than those of the thermo-setting type under conditions wherein it is subjected to considerable heat, as in a headlight, for the reason that the heat tends to drive off the plasticizer and discolor the remaining plastic. On the other hand, the vinyl acetal layer may be found useful when used with polarizing surfaces of greater area, particularly for the reason that it tends to protect the glass support and polarizer against shattering.

With a cushion layer having properties such as those possessed in the above examples, there will preferably be used in surface layer 16 a relatively hard and abrasion-resistant material. Moreover, said layer will be of substantially less thickness than cushion layer 18 and may, for example, be as thin as .0015 inch. Such properties in a layer of such thickness may be obtained by using a urea-formaldehyde type resin to which is added an oxidizing modifier. For example, layer 16 may comprise a thin coating of "Polymerin 400-1," a mixture composed of 50–55% of "Uformite F-200" and 50–45% of "Duraplex A-27," or a mixture composed of equal parts of the melamine-formaldehyde resin sold under the trade name "Uformite MM-55" and "Duraplex A-27" or "Duraplex A-25." Many similar compositions for producing a layer of the same properties will doubtless be apparent to those skilled in the art, the primary conditions for the layer being that it be of sufficient hardness to withstand abrasion in a layer sufficiently thin to transmit impact to cushion layer 18 without cracking.

The above coatings may be applied to the lens in a variety of ways. For example, if the resin mixture to be used in the cushion layer is of sufficient viscosity, it may be applied in a single coating by means of a suitably shaped doctor blade. If it is too thin to be applied in this manner, the cushion layer may be built up in a series of thin coats, as by spraying. Alternatively, this may conveniently be done by rotating the lens face up on a vertical axis and pouring the resin solution over its face, an even distribution being aided by centrifugal force. A satisfactory thickness may be obtained with approximately four to eight coats, depending largely upon the viscosity of the mixture. Each coat should be dried separately, which may be done conveniently by baking for approximately ten minutes at a temperature of approximately 80° C. The lens may then be permitted to cool at room temperature for about ten minutes before the next coat is applied. If the solution is sufficiently viscous to be applied in a single coat, the baking operation will take longer, a period of twenty to thirty minutes at 120° C. giving satisfactory results.

If the cushion layer is to be formed of vinyl acetal resin, it may be applied by spinning or with a doctor blade in the manner described for other resins. Alternatively, it may be laminated to the surface of the lens in sheet form. In either case, it should be thoroughly dried as, for example, by baking at approximately 90° C. for about three hours.

After the cushion layer is completed and set, surface layer 16 may ordinarily be applied in a single coating as by means of the spinning technique described above. It will preferably be permitted to dry at room temperature for ten to twenty minutes, and the lens may then be submitted to a final baking for a half to one and one-half hours at a temperature ranging from 130° C. to 150° C., the time necessary for this operation being determined by the temperature at which the baking is done. Furthermore, if a melamine-formaldehyde resin is used, substantially lower curing temperatures may be employed.

It will be noted that the coatings of the invention have been described as dual layer coatings. It should be pointed out that it is possible within the scope of the invention to secure substantially the same properties by applying several layers, each containing a progressively greater quantity of an oxidizing and setting modifier. Alternatively, substantially the same result may be obtained by applying a single, relatively thick coating and differentially curing it so that the outer portions become harder than the inner portions. All such modifications are to be construed as coming within the scope of the invention.

It is to be understood that the coatings of the invention are not limited to use on headlight and other lenses but are useful in combination with many other types of light-polarizing devices. Moreover, although they are particularly useful on non-planar surfaces which would be difficult to protect by glass lamination, they may be used with equal facility in the production of flat polarizing surfaces. It should also be understood that they are not limited to use upon polarizing surfaces mounted on glass or other supporting elements but may be used to protect both sides of sheet polarizing materials such as those sold under the trade name "Polaroid." Many similar applications of the invention will be apparent to those skilled in the art and are to be construed as coming within the scope of the invention and of the claims herein.

Since certain changes may be made in the above product and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. As a new article of manufacture, a light-polarizing device comprising, in combination, a light-transmitting supporting element, means providing on said support a light-polarizing surface comprising an extremely thin film of molecularly oriented plastic material, means for protecting said polarizing surface from impact, said last-named means comprising a layer of resilient, impact-resistant, light-transmitting, plastic material adhering to said polarizing surface, said layer comprising a resin from the class consisting of urea-formaldehyde and melamine-formaldehyde and a non-oxidizing and substantially non-setting alkyd resin, and means for protecting said last-named layer from abrasion, said last-named means comprising a layer of relatively hard, abrasion-resistant, light-transmitting plastic material adhering to said impact-resistant layer.

2. As a new article of manufacture, a light-polarizing device comprising, in combination, a light-transmitting supporting element, means providing on said support a light-polarizing surface comprising an extremely thin film of molecularly oriented plastic material, means for protecting said polarizing surface from impact, said last-named means comprising a layer of resilient, impact-resistant, light-transmitting, plastic material adhering to said polarizing surface, said layer comprising a resin from the class consisting of urea-formaldehyde and melamine-formaldehyde and a non-oxidizing and substantially non-setting alkyd resin, and means for protecting said last-named layer from abrasion, said last-named means comprising a layer of relatively hard, abrasion-resistant, light-transmitting plastic material adhering to said impact-resistant layers, said abrasion-resistant layer comprising a resin from the class consisting of urea-formaldehyde and melamine-formaldehyde.

3. In a polarizing headlight, in combination, a light-transmitting lens, means providing on the outer face of said lens a light-polarizing surface comprising an extremely thin film of molecularly oriented plastic material, means for protecting said polarizing surface from impact, said last-named means comprising a resin from the class consisting of urea-formaldehyde and melamine-formaldehyde and a non-oxidizing and a substantially non-setting alkyd resin in an amount sufficient to prevent said layer from setting to rigidity, and means for protecting said last-named layer from abrasion, said last-named means comprising a layer of relatively hard, abrasion-resistant, light-transmitting, plastic material adhering to said impact-resistant layer, said abrasion-resistant layer comprising a resin from the class consisting of urea-formaldehyde and melamine-formaldehyde and an oxidizing alkyd resin.

4. In a polarizing headlight, in combination, a light-transmitting lens, means providing on the outer face of said lens a light-polarizing surface comprising an extremely thin film of molecularly oriented plastic material, means for protecting said polarizing surface from impact, said last-named means comprising a resin from the class consisting of urea-formaldehyde and melamine-formaldehyde, an oxidizing alkyd resin, and a non-oxidizing and substantially non-setting alkyd resin in an amount sufficient to prevent said layer from setting to rigidity, and means for protecting said last-named layer from abrasion, said last-named means comprising a layer of relatively hard, abrasion-resistant, light-transmitting, plastic material adhering to said impact-resistant layer, said abrasion-resistant layer comprising a resin from the class consisting of urea-formaldehyde and melamine-formaldehyde and an oxidizing alkyd resin.

5. In a polarizing headlight, in combination, a transparent lens, means providing on the outer face of said lens a light-polarizing surface comprising an extremely thin film of molecularly oriented plastic material, means for protecting said polarizing surface from impact, said last-named means comprising approximately three parts of "Polymerin 400-1" and one part of "Paraplex G-20," and means for protecting said last-named layer from abrasion, said last-named means comprising a layer of relatively hard, abrasion - resistant, light-transmitting plastic material adhering to said impact-resistant layer, said abrasion-resistant layer comprising "Polymerin 400-1."

6. As a new article of manufacture, a light-polarizing device comprising, in combination, a light-transmitting supporting element, means providing on said support a light-polarizing surface comprising an extremely thin film of molecularly oriented plastic material, the thickness of said film being of the order of 0.00015 inch, means for protecting said polarizing surface from impact, said last-named means comprising a layer of resilient, impact-resistant, light-transmitting, plastic material adhering to said polarizing surface, and means for protecting said last-named layer from abrasion, said last-named means comprising a layer of relatively hard, abrasion-resistant, light-transmitting, plastic material adhering to said impact-resistant layer.

7. As a new article of manufacture, a light-polarizing device comprising, in combination, a light-transmitting supporting element, means providing on said support a light-polarizing surface comprising an extremely thin film of molecularly oriented plastic material, means for protecting said polarizing surface from impact, said last-named means comprising a layer of resilient, impact-resistant, light-transmitting, plastic material adhering to said polarizing surface, said layer comprising a relatively hard, thermo-setting resin and a substantially non-setting modifier for said resin in an amount sufficient to prevent said layer from setting to rigidity, and means for protecting said last-named layer from abrasion, said last-named means comprising a layer of relatively hard, abrasion-resistant, light-transmitting, plastic material adhering to said impact-resistant layer.

8. As a new article of manufacture, a light-polarizing device comprising, in combination, a light-transmitting supporting element, means providing on said support a light-polarizing surface comprising an extremely thin film of molecularly oriented plastic material, means for protecting said polarizing surface from impact, said last-named means comprising a layer of resilient, impact-resistant, light-transmitting, plastic material adhering to said polarizing surface, said layer comprising a resin from the class consisting of urea-formaldehyde and melamine-formaldehyde and a non-oxidizing and substantially non-setting alkyd resin in an amount sufficient to prevent said layer from setting to rigidity, and means for protecting said last-named layer from abrasion, said last-named means comprising a layer of relatively hard, abrasion-resistant, light-transmitting, plastic material adhering to said impact-resistant layer.

9. As a new article of manufacture, a light-polarizing device comprising, in combination, a light-transmitting supporting element, means providing on said support a light-polarizing surface comprising an extremely thin film of molecularly oriented polyvinyl alcohol having a dichroic stain incorporated therewith, the thickness of said film being of the order of 0.00015 inch, means for protecting said polarizing surface from impact, said last-named means comprising a layer of resilient, impact-resistant, light-transmitting, plastic material adhering to said polarizing surface, said layer comprising a relatively hard, thermo-setting resin and a substantially non-setting modifier for said resin in an amount sufficient to prevent said layer from setting to rigidity, and means for protecting said last-named layer from abrasion, said last-named means comprising a layer of relatively hard, abrasion-resistant, light-transmitting, plastic material adhering to said impact-resistant layer.

10. As a new article of manufacture, a light-polarizing device comprising, in combination, a light-transmitting supporting element, means providing on said support a light-polarizing surface comprising an extremely thin film of molecularly oriented plastic material, the thickness of said film being of the order of 0.00015 inch, means for protecting said polarizing surface from impact, said last-named means comprising a layer of resilient, impact-resistant, light-transmitting, plastic material adhering to said polarizing surface, said layer comprising a resin from the class consisting of urea-formaldehyde and melamine-formaldehyde and a non-oxidizing and substantially non-setting alkyd resin in an amount sufficient to prevent said layer from setting to rigidity, and means for protecting said last-named layer from abrasion, said last-named means comprising a layer of relatively hard, abrasion-resistant, light-transmitting, plastic material adhering to said impact-resistant layer.

LEWIS W. CHUBB, Jr.
CLINTON J. T. YOUNG.